J. E. DUNKLEY.
LIQUID FUEL BURNER.
APPLICATION FILED JAN. 16, 1911.
993,768.
Patented May 30, 1911.
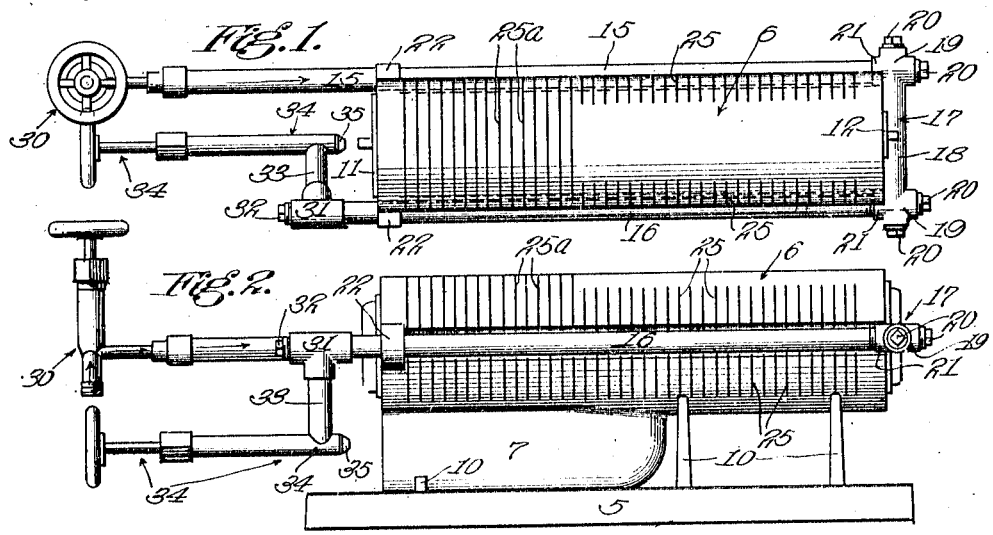
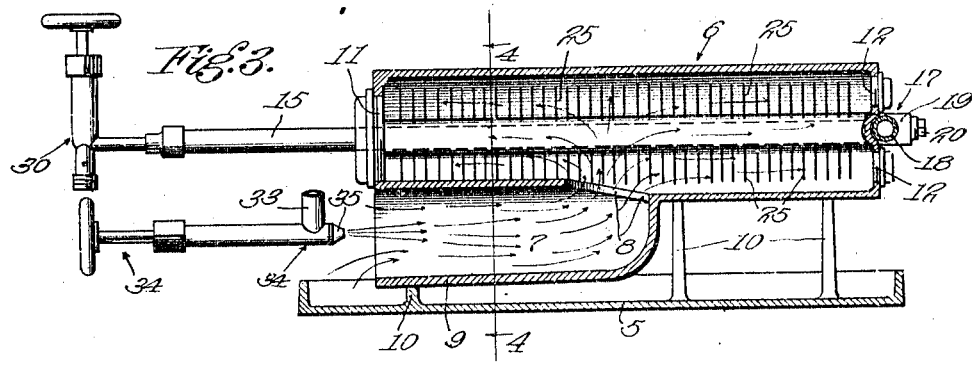
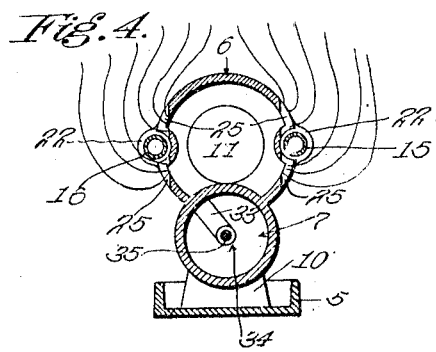
Witnesses
Fred. W. Brown
Fred. Welles
Inventor
James E. Dunkley.
by Miles T. Barkelew
his Attorney.

UNITED STATES PATENT OFFICE.

JAMES E. DUNKLEY, OF LOS ANGELES, CALIFORNIA.

LIQUID-FUEL BURNER.

993,768.  Specification of Letters Patent.  Patented May 30, 1911.

Application filed January 16, 1911. Serial No. 602,904.

*To all whom it may concern:*

Be it known that I, JAMES E. DUNKLEY, a citizen of the United States, residing at Los Angeles, in the county of Los Angeles, State of California, have invented new and useful Improvements in Liquid-Fuel Burners, of which the following is specification.

This invention relates to a liquid fuel burner of the generator class, having a tube or pipe system in which the liquid fuel, preferably distillate, is vaporized before it is passed into the burner and mixed with air for combustion.

The invention consists in certain novel features and combinations whereby the liquid is thoroughly and uniformly vaporized and heated to such an extent that it will burn with a clear blue flame when mixed with air in appropriate proportions. The general configuration of the burner and the peculiar placement of the vaporizing pipes are conducive to this end. The pipes are placed around the mixing chamber and the flame burns both above and below the pipes; but the pipes are partially sunk within the outer surface of the chamber walls so that they are protected to a certain extent from the greatest heat of the flame, but are still in the zone of uniform temperature. It is well known that the highest temperature of a flame produced by mixing combustible gas and air is somewhat near the center of the flame, perhaps closer to the tip of the flame than to the base. The mixing chamber of the burner consequently becomes heated very uniformly by radiated heat; it is not raised to a high temperature at one point and allowed to be quite cool at another. For these reasons it will be seen that the structure described in the following specification is adapted for producing a flame of even qualities and of uniformly efficient combustion.

In the accompanying drawings I have illustrated a form of my invention, which I prefer, in which drawings:

Figure 1 is a plan of my improved liquid fuel burner. Fig. 2 is a side elevation of the same. Fig. 3 is a longitudinal section of the same. Fig. 4 is a vertical cross section taken on line 4—4 of Fig. 3.

In the drawings 5 designates a base of convenient proportions for supporting my burner, and formed in the manner of a tray for catching liquid which may drip out of the burner and for holding the liquid used for initial generation. All of these points are of standard usage and need not be explained in detail.

The body portion of my burner consists essentially of an approximately tubular mixing chamber 6 and a mixing tube 7. The mixing tube starts from the front end of the mixing chamber where it is completely open, and passes to the center of the mixing chamber where an aperture 8 connects it with the chamber interior. Tube 7 is of approximately cylindrical form and projects upwardly into the mixing chamber as is best shown in Figs. 3 and 4. This brings the burner into more compact form and also places the mixing tube closer to the heat of the flame, heating the air and gases more efficiently than would otherwise be the case. The lower wall of the mixing tube, as shown at 9 in Fig. 3, slopes slightly downwardly toward the open end, so that any liquid may pass out of the tube into the base. The burner is supported from the base on standards 10 of any convenient design; this feature may be varied at will. Mixing chamber 6 is provided with openings 11 and 12 at each end, the openings being normally closed by screw plugs. Whenever it is necessary to clean the inside of the mixing chamber, these plugs are removed and the interior is again readily accessible.

Along each side of the mixing chamber a semi-cylindrical depression is formed extending from end to end. This depression is also extended across the back of the chamber. Generating pipes 15 and 16 are placed alongside the chamber and sunk about half their diameter in the depressions. Pipes 15 and 16 screw into a fixture 17 at the rear end of the burner. This fixture comprises a tube 18 which extends across the rear end of the burner and which carries on its ends two cross couplings 19. Plugs 20 afford means of access to pipes 16, 15 and 17 for cleaning. It will be seen that pipes 15 and 16 are supported so that they do not rest directly on the body portion of the mixing chamber, being supported at each end, at the rear end by portions 21 of cross couplings 19 and at the front end by straps 22 (as best shown in Fig. 4).

Vertical slots are cut in the sides of the mixing chamber as illustrated at 25. These slots are cut both above and below the pipes 15 and 16, but it will be seen that they do not extend directly opposite the pipes and beneath them. This prevents the flame from playing directly on the pipes, passing above, below and around the pipes without impinging upon it. Although I prefer to cut the slots only on the sides of the burner they may be extended over the top as illustrated at 25ª in Figs. 1 and 2.

Pipe 15 extends forwardly from the flame and carries an admission valve 30 of an approved design. The liquid fuel enters through this valve and passes along pipe 15, around through fitting 17, back through pipe 16 to a T-fitting 31 at the front end of the burner. A plug 32 is provided in T-fitting 31 for the purpose of cleaning pipe 16 from its forward end. By the time the fuel reaches the forward end of the pipe 16 it is in its vaporized form. The vapor passes down through branch 33 to valve 34, whence it is discharged through nozzle 35 into mixing tube 7. Valve 34 is of the ordinary needle valve design usually used for such purposes. The gases projected into the mixing tube draw a stream of air through the same, the air becoming mixed with the gases to a certain extent and passing into the mixing chamber. Here the air and gases are thoroughly intermingled and distribute themselves at an even pressure over the interior of the mixing chamber. Escaping through slots 25, the mixed gas and air burns in a flame extending outwardly and upwardly from the burner. As before noted, the flame does not impinge directly upon the generating pipes, but flows outwardly and upwardly around them as is best illustrated in Fig. 4. The generating pipes are heated uniformly once the burner is started. Initial generation is accomplished in the usual manner by opening the valves and allowing a sufficient liquid to accumulate in base 5, which, when ignited, will produce sufficient heat to start the generation of the gases. The flame will then start in the usual manner and the ordinary operation of the burner continues.

Having described my invention, I claim:

1. A liquid fuel burner, comprising an approximately cylindrical mixing chamber having longitudinal depressions in its outer walls and discharge slots above and below the depressions, a mixing tube extending along the lower side of the mixing chamber and discharging into the same, a generating tube in the said longitudinal depressions, and means for discharging the generated vapor from the generating tube into the mixing tube.

2. A liquid fuel burner, comprising an elongated mixing chamber having longitudinal depressions in its outer walls and discharge openings adjacent the depressions, the bottom walls of the depressions being imperforated, a generating tube in the said depressions, and means for discharging the vapor generated in the tube into the mixing chamber.

3. A liquid fuel burner, comprising an elongated mixing chamber having longitudinal depressions in its outer walls and discharge openings adjacent the depressions, the bottom walls of the depressions being imperforated, a generating tube in the said depressions, a mixing tube extending along the underside of the generating chamber and discharging thereinto near the center thereof, and means for discharging the vapor generated in the generating tube into the mixing tube.

4. A liquid fuel burner, comprising an elongated approximately cylindrical mixing chamber having longitudinal depressions in its outer side walls and having discharge slots in its outer side walls extending both above and below the depressions, the bottom walls of the depressions being imperforated, a mixing tube extending from one end to a point near the center of the mixing chamber along its under wall, the mixing tube extending slightly into the mixing chamber, a generating tube in the said depressions and adapted to form a passage around the sides and rear end of the chamber, an inlet valve adapted to control the admission of fluid to one end of the tube, means connected to the tube on the other end for injecting the generated vapor into the forward end of the air tube.

In witness that I claim the foregoing I have hereunto subscribed my name this 9th day of January 1911.

JAMES E. DUNKLEY.

Witnesses:
  LIZZIE D. BRETT,
  JAMES T. BARKELEW.